United States Patent [19]
Oliver

[11] 3,869,025
[45] Mar. 4, 1975

[54] SELF-ADJUSTING BRAKE MECHANISM
[75] Inventor: James L. Oliver, Royal Oak, Mich.
[73] Assignee: Eaton Corporation, Cleveland, Ohio
[22] Filed: Oct. 10, 1972
[21] Appl. No.: 296,359

[52] U.S. Cl. .................. 188/79.5 GE, 188/196 BA
[51] Int. Cl. ............................................ F16d 65/56
[58] Field of Search... 188/79.5 R, 79.5 P, 79.5 GE, 188/196 BA, 206 A, 79.5 GT

[56] References Cited
UNITED STATES PATENTS

| | | | |
|---|---|---|---|
| 2,175,446 | 10/1939 | Rasmussen et al. | 188/79.5 GE |
| 2,378,662 | 6/1945 | Shuman | 188/79.5 GT |
| 3,068,964 | 12/1962 | Williams et al. | 188/79.5 GE |
| 3,610,374 | 10/1971 | Troyer | 188/79.5 GE |
| 3,623,578 | 11/1971 | Plume | 188/79.5 P |

*Primary Examiner*—Duane A. Reger
*Attorney, Agent, or Firm*—Teagno & Toddy

[57] ABSTRACT

A brake assembly having a pair of brake shoes each moved an equal distance into engagement with a brake drum by a brake actuator and each positionally adjusted relative to the drum by a brake adjuster an equal distance corresponding to brake lining wear during movement of the shoes toward the drum. The actuator is a wedge type brake having a pair of tines movable by an air motor an amount sufficient to force a pair of properly adjusted shoes into engagement with the drum. Each tine engages a jackscrew contacting the upper end of one of the shoes. A ratchet wheel is secured to one element of each jackscrew and is rotated by movement of a pawl. The pawls are interconnected for corresponding movement and receive energy via a torsional spring which in turn is energized in response to movement of the tines. When the shoes effect braking of the drum, the axial force on each jackscrew prevents relative rotation of the jackscrew elements regardless of the rotational force exerted by the pawls, causing the torsional spring to act as a "lost motion" mechanism. The force needed to rotate the ratchet wheels is transmitted to the pawls via the torsional springs only after the tines have moved a sufficient distance to cause engagement of properly adjusted shoes with the drum. The actuator and adjuster are enclosed dustproof housing. A wedge shaped plate is secured to a frame that is used to support the shoes for displacement into contact with the drum. Angular sides on the plate engage the lower ends of the shoes. Shoes having worn linings can be replaced without disassembling the adjuster by removing the plate, moving the shoes away from the drum and then withdrawing the shoes from the drum.

22 Claims, 3 Drawing Figures

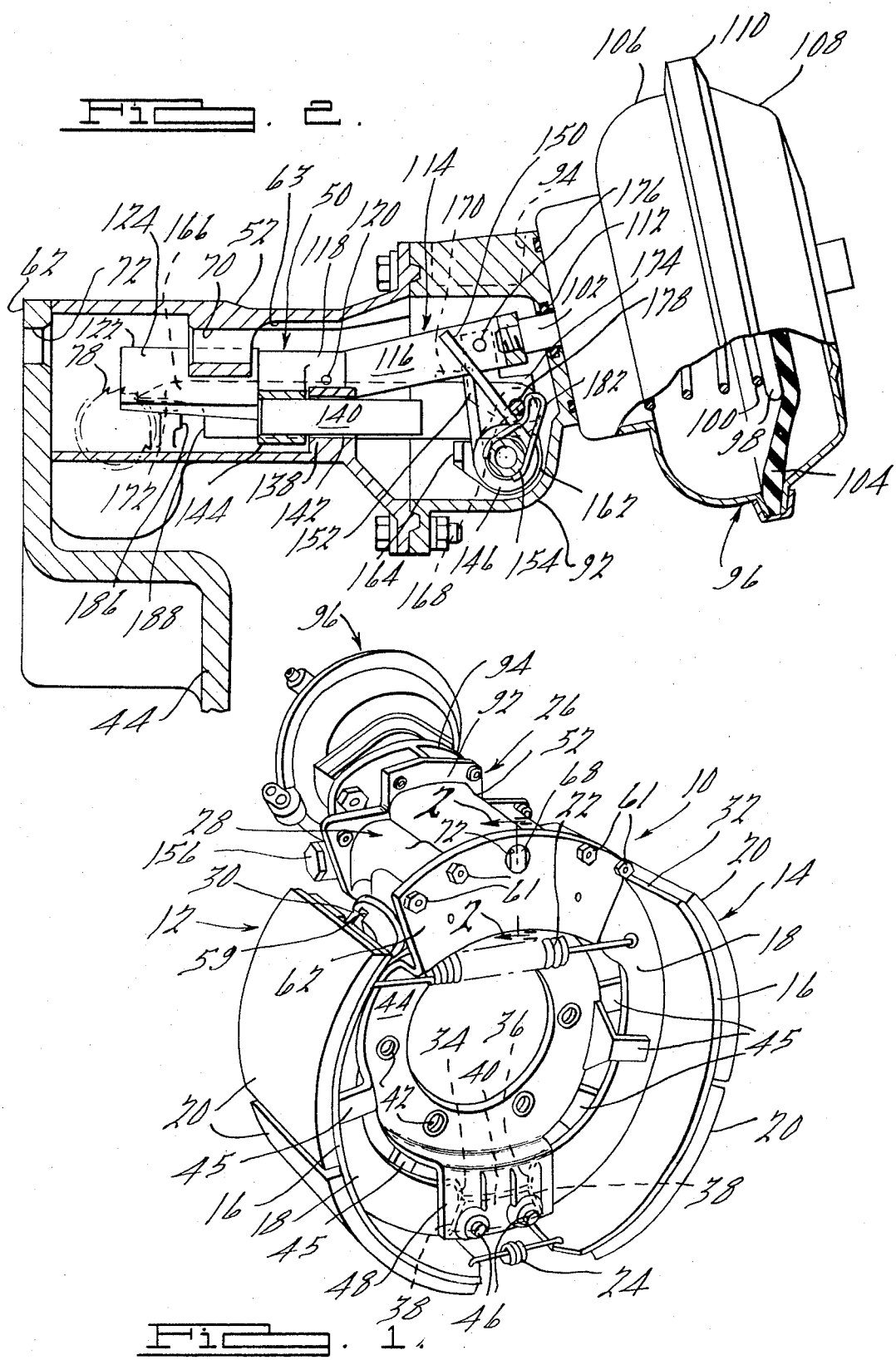

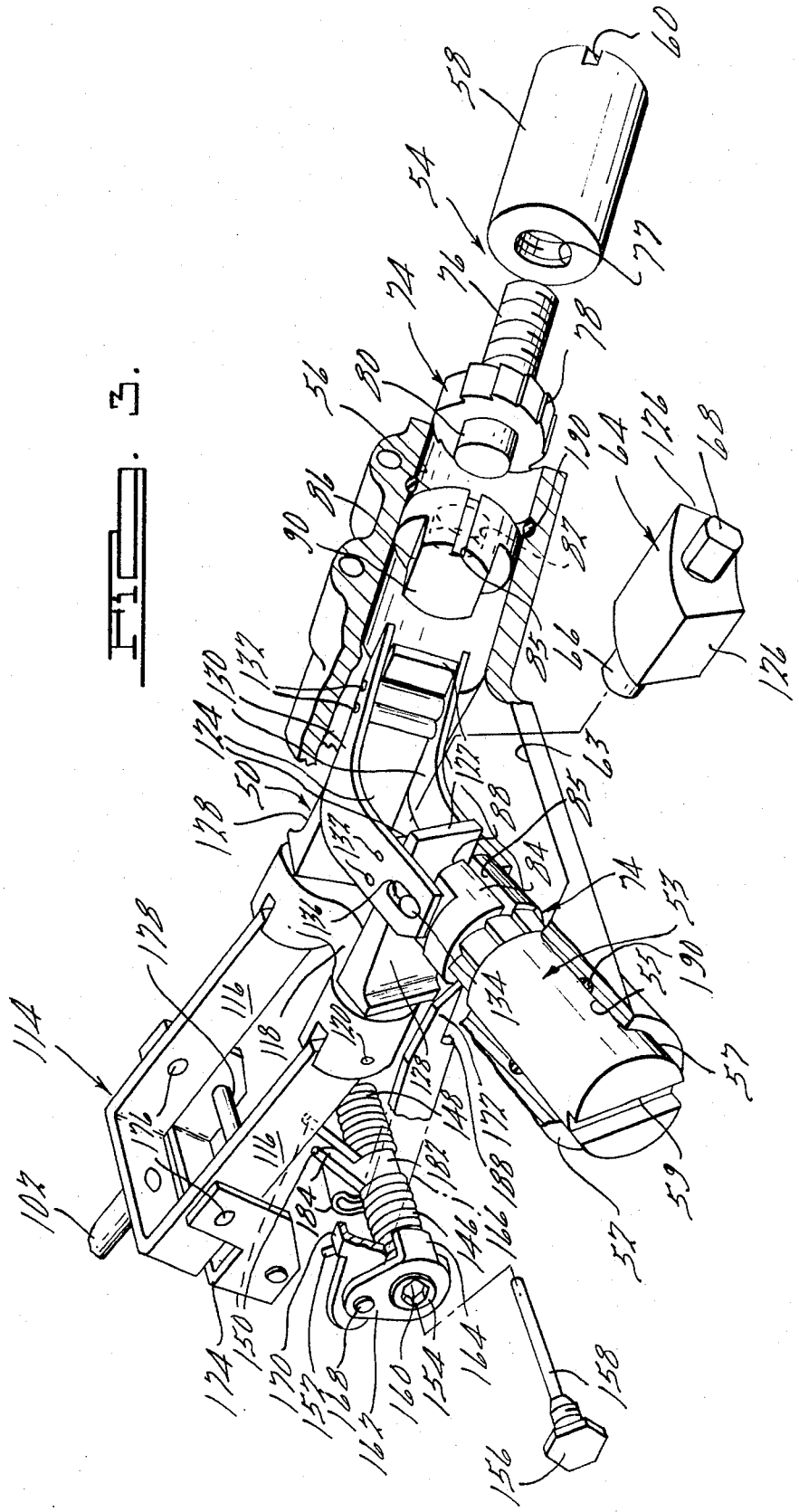

SELF-ADJUSTING BRAKE MECHANISM

BACKGROUND OF THE INVENTION

1. Field of the Invention

The present invention relates to a brake mechanism, and more particularly to a brake mechanism having a brake adjuster for effecting automatic adjustment of the position of the brake shoes relative to the brake drum by an amount corresponding to brake lining wear.

2. Description of the Prior Art

It is known to provide, in a brake assembly having two brake shoes located for movement from an initial position to a position in which they engage a brake drum, a brake actuator that moves each shoe an equal distance into engagement with the drum to assure that the work of the braking action is equally distributed between the two shoes and that the linings of the two shoes wear equally. In order to maintain these advantages, brake adjusters have been provided which adjust the initial position of each shoe an equal amount to compensate for the equal wear on the linings. Such brake assemblies are readily adaptable for use on a tractor truck. Problems, however, have been encountered with such assemblies in maintaining high standards of reliability and durability of the adjusters at an acceptable cost.

The "self-adjustment" mechanisms of such brake assemblies operate in various ways. In one arrangement each brake actuation resets the initial position of the shoe relative to the drum by accommodating a restoring movement to the shoes which is always a predetermined amount less than the original shoe movement. A follower is provided in this arrangement to prevent return of the shoes to the initial starting positions. In another arrangement the shoes are advanced only when the shoes are displaced beyond a predetermined amount which often corresponds to shoe clearance plus component distortion. In yet another arrangement the adjustment of the shoes is accomplished by a "lost motion" mechanism which operates in the shoe environment. In still other arrangements shoe adjustment is accomplished only during release of the shoes or reverse operation of the vehicle. Each of the above known arrangements have one or more operational disadvantages which include: the initial position of the shoes is advanced to a point to cause the shoes to frictionally engage the drum when the actuator used to move the shoes is in a non-operative position; it is difficult to maintain constant shoe play within relatively small tolerances; the adjuster is subjected to dirt and rust as a result of its location in the shoe environment causing premature repair or adjuster failure; and considerable lining wear occurs without the shoes becoming fully released or the vehicle being reversed causing poor braking action due to inadequate shoe adjustment.

Another disadvantage that is often present in prior art brake assemblies, is that, when replacing the shoes, it is necessary to first disassemble the adjuster in order to move the shoes away from the drum. Such a procedure is both time-consuming and expensive.

A further disadvantage that is often present in prior art brake assemblies is that it is difficult to quickly and accurately manually adjust the shoes relative to the drum without either disassembling part or all of the brake actuator and/or adjuster or using complicated jigs and measuring tools. The use of a single wrench for manual adjustment of the shoes would be very beneficial to reduce both brake assembly repair and shoe replacement time and cost.

SUMMARY OF THE INVENTION

It is an object of the present invention to provide an inexpensive, reliable, and durable brake assembly.

Another object of the invention is to provide a self-adjusting brake mechanism requiring fewer and more durable, components than prior art units.

A further object of the invention is to provide a brake assembly having a brake adjuster which is not affected by dirt existing in the brake shoe environment.

Yet another object of the invention is to provide a self-adjusting brake mechanism which will allow removal of the brake shoes without disassembly of the adjuster mechanism.

Still another object of the invention is to provide a self-adjusting brake mechanism which can be quickly and easily manually adjusted with simple tools.

The braking mechanism of the invention includes a brake actuator engaged with the upper ends of each of the brake shoes to move the shoes from an initial position into engagement with the brake drum, and a brake adjuster engaged with the upper ends and operative concurrently with the operation of the brake actuator to adjust the shoes an amount relating to brake lining wear. In the disclosed embodiment, the brake adjuster is in the form of jackscrews interposed between the brake actuator and the upper ends of the shoes.

According to another feature of the invention, the brake actuator and the brake adjuster are located within a housing adjacent one end of the shoes, thereby removing the brake adjuster from the contaminated environment of the shoe and drum.

According to still another feature of the invention, each of the jackscrews includes a first element engaged with the upper end of a shoe and a second element engaging the brake actuator. The second element includes a threaded portion in threaded engagement with the first element and a ratchet wheel. The ratchet wheels are rotated by a pair of pawls that are interconnected for corresponding movement. The pawls move concurrently with the brake actuator and rotate the second element relative to the first element to vary the effective length of the jackscrew during brake adjustment.

According to a further feature of the invention linear movement of the brake actuator is transferred via a torsional spring to the pawls to move the pawls in a direction tending to cause the pawls to rotate the second elements of the jackscrews relative to the first elements.

According to a still further feature of the invention, the brake actuator may be moved by a tool, such as a hex head wrench, to cause the shoes to move toward the drums and to vary the effective length of the jackscrews via the ratchet wheel and pawls in the event shoe adjustment is needed.

According to yet another feature of the invention, a plate engaged with the lower ends of the shoes is secured by bolts to a frame which supports the shoes. The plate can be readily removed from the frame to allow the shoes to be removed from the brake assembly without disassembling the brake adjuster mechanism.

BRIEF DESCRIPTION OF THE DRAWINGS

A preferred embodiment of the invention is illustrated in the accompanying drawings in which:

FIG. 1 is a perspective view of a brake assembly embodying a brake mechanism according to the invention;

FIG. 2 is an enlarged sectional view taken on line 2—2 of FIG. 1; and

FIG. 3 is an enlarged perspective, fragmentary, partially exploded view of the brake mechanism embodied in FIGS. 1 and 2.

DETAILED DESCRIPTION OF THE DRAWINGS

FIG. 1 illustrates a brake assembly 10 constructed to provide for substantially equal movement of a pair of opposed brake shoes 12 and 14 into contact with a cylindrical brake drum of a known design (not illustrated). Brake assembly 10 may be applied to numerous different vehicles but the illustrated embodiment is primarily constructed for tractor truck use.

Each of the shoes 12 and 14 has a table 16 and a web 18. Friction linings 20 are mounted, by riveting or bonding, on table 16 of shoes 12 and 14. Linings 20 are fabricated of a suitable compound for frictional and wear properties and resistance to heat generated during braking.

Shoes 12 and 14 are biased inwardly toward an initial or rest position by upper and lower springs 22 and 24 connected in a known manner to the webs 18 of the shoes. A brake actuator 26, similar in design and operation to the one illustrated in U.S. Pat. No. 3,572,478 assigned to the assignee of the present invention, is associated with a brake adjuster mechanism 28 between the upper or first ends 30 and 32, respectively, of shoes 12 and 14 to effect the outward movement of the shoes into engagement with the drum. The lower or second ends 34 and 36, respectively, of shoes 12 and 14 abut angular sides 38 of an equilateral trapezoid plate 40. As brake actuator 26 spreads first ends 30 and 32 of shoes 12 and 14 apart, second ends 34 and 36 of the shoes are free to slide on the angular sides 38. Shoes 12 and 14 are thus brought into contact with the rotating cylindrical brake drum to effect stopping of the vehicle. Brake adjuster 28 effects adjustment of the position of the shoes in response to movement of brake actuator 26 an amount corresponding to the wear that has occurred on linings 20.

Brake assembly 10 is mounted in association with an axle housing of a known design (not illustrated) and is fastened to the axle housing flange by a number of bolts projecting through openings 42 spaced circumferentially around a spider support member 44. Support member 44 includes fingers 45 contacting the opposite sides of webs 18 to support shoes 12 and 14 for free floating movement. A pair of bolts 46 and associated nuts and washers secure equilateral trapezoid plate 40 to a lower tab 48 of support member 44 proximate the second ends 34 and 36 of shoes 12 and 14.

Brake actuator 26 is of the wedge type and comprises a bifurcated wedge assembly 50 (FIGS. 2 and 3) located in an operator housing 52. Two plungers 53 and 54, in the form of jackscrews, are in sliding engagement with cylindrical passages 55 and 56 in housing 52. The axis of each plunger 53 and 54 is disposed at approximately a 30° angle relative to a vertical line drawn through the center of brake assembly 10 when the brake assembly is located on a vehicle. Plungers 53 and 54 each have first ends 57 and 58 which in turn have a slot 59 and 60, respectively. The first ends extend outwardly from the extremities of housing 52. The slots 59 and 60 of the first ends 57 and 58 are adapted for sliding engagement with the first ends 30 and 32 of shoes 12 and 14.

An upper tab 62 of support member 44 is secured to housing 52 by means of a number of fasteners 61 of a known design. Tab 62 supports housing 52 intermediate the first ends 30 and 32 of shoes 12 and 14 and seals one end of chamber 63, within housing 52, used to house brake actuator 26 and brake adjuster 28. An anchor 62 having opposite ends 66 and 68 is secured centrally within actuator 26 within chamber 63. Ends 66 and 68 are journaled in openings 70 and 72, respectively, located in housing 52 and upper tab 62 to provide translational and rotational support for the anchor. End 68 is asymmetrical to prevent rotation of anchor 64 relative to housing 52. In an effort to simplify the drawings, anchor 64 does not appear in FIG. 2.

Plungers 53 and 54 each include a ratchet wheel adjuster screw 74 comprising a threaded portion 76 for threaded engagement with mating threads 77 in the respective first ends 57 and 58, a ratchet wheel 78, and a smooth cylindrical portion 80. Cylindrical portion 80 is journaled within a cylindrical passage 82 located within the second ends 84 and 86 of each plunger. Second ends 84 and 86, respectively, are keyed in housing 52 via slots 85 to prevent relative rotation about the axis of the respective plunger and each include an abutting surface 88 and 90 located at an angle of approximately 5° relative to a perpendicular to the axis of each plunger.

Integral with housing 52 is a generally hollow cylindrical housing portion 92 including an attaching flange 94 at one end thereof. An air motor 96, of a known design, is attached to flange 94. Air motor 96 includes a piston element 98, spring 100, push rod 102 connected to piston 98, and a flexible diaphragm 104. the motor housing is defined by elements 106 and 108 secured together by means of a clamp band 110. The outer periphery of diaphragm 104 is secured to the motor casing between the elements 106 and 108. A seal 112 of a known design is provided at the interface of air motor 96 and flange 94 to keep foreign matter from entering chamber 63 from the air motor.

A yoke 114 is in threaded engagement with the end of push rod 102 of air motor 96. Opposite legs 116 of yoke 114 are pivotally secured to a body portion 118 of wedge assembly 50 by pivot pins 120. Body portion 118 has a pair of tines 122. Each tine includes a face 124 which lies in a plane parallel to the faces 126 on opposite sides of anchor 64 and the path of horizontal movement of push rod 102. Tines 122 further include a wedge face 128 which converges toward the respective face 124 of the tine and is parallel to the respective abutting surfaces 88 and 90 on seconds ends 84 and 86, respectively, of plungers 53 and 54.

Tines 122 straddle the anchor 64. The faces 126 of anchor 64 extend perpendicular to the axis of the plungers 53 and 54. Surrounding each tine 122 is a roller cage 130 (FIG. 3) having a pair of roller elements 132 contacting the respective surface 124 of the anchor and the respective surface 126 of the tines and a single roller element 134, larger in diameter than each of the roller elements 132, contacting the respective wedge face 128 of the tines and the respective abutting surface 88, 90 of the plungers. The ends of each single roller element 134 are located in slotted openings 136 in cage 130 and are movable therein along the longitudinal axis of the respective plungers 53 and 54. If desired roller elements 132 may also be located in slotted openings.

Within chamber 63, housing 52 has a projection 138 (FIG. 2) including a passageway therein for the purpose of receiving a guide rod 140. Interposed between guide rod 140 and projection 138 is a bushing 142. Guide rod 140 is in sliding engagement with the bushing. One end of guide rod 140 is secured to a projection 144 on body portion 118. Projection 144 functions to limit, upon contact with projection 138, the return stroke of wedge assembly 50. As force is exerted by air motor 96 through push rod 102 tending to displace the body portion 118 of wedge assembly 50 to the left in FIG. 2, guide rod 140 through projection 138 resists the vertical force component developed on body portion 118 thus permitting only horizontal movement of the body portion and attached tines 122 along a line parallel to the longitudinal axis of the guide rod. Rollers 132 also resist the vertical force components on wedge assembly 50.

Briefly, brake actuator 26 operates in the following manner. As push rod 102 moves to the left in FIG. 2, tines 122 are forced to the left moving the pins 134 away from the pins 132. The separation results in axial movement of plungers 53 and 54 causing the first ends 57 and 58, respectively, to force the first ends 30 and 32 of shoes 12 and 14 outwardly causing engagement of the friction linings 20 with the brake drum. Since brake actuator 26 is known in the art a further description of this portion of the disclosure does not appear to be warranted. A detailed description of the construction and operation of the actuator mechanism can be found in U.S. Pat. No. 3,572,478 assigned to the assignee of the present invention.

Brake adjuster 28 is described with reference to FIGS. 2 and 3 wherein a pair of torsional springs 146 and 148, each having inner and outer tangs 150 and 152, encircles a tubular member 154. Two bolts 156 are in threaded engagement with housing 52 and have elongated portions 158 projecting into tubular member 154 to retain the tubular member relative to housing 52 while permitting the tubular member to rotate relative to bolts 156. Each end of tubular member 154 projects within a hex-shaped opening 160 located within a bell crank 162. The ends of tubular member 154 are wedged outwardly to conform to hex-shaped openings 160 to provide one to one movement therebetween. The shape of the hex-shaped openings 160 preferably conform to the shape of a standard hex head wrench.

Each bell crank 162 has an inwardly facing lip 164. A pawl 166 is pivotally connected by a pivot pin 168 to each of the bell cranks 162 and rests on lip 164 when the brake adjuster is not located within chamber 63. Each pawl 166 has an ear 170 projecting inwardly and engaged with an outer tang 152. Opposite the engagement of tang 152 of ear 170 end 172 of each pawl 166 is engaged with the teeth of the respective ratchet wheel 78. Each pawl 166 is bent 30° intermediate the connection of pivot pin 168 and end 172 to align end 172 with the teeth of the respective ratchet wheel 78 for proper engagement.

A bracket 174 is rigidly secured to the end of yoke 114 proximate push rod 102 by pins 176. Bracket 174 includes a transversely located actuator pin 178 which is adapted for mating engagement with the inner tangs 150 of springs 146 and 148 upon movement of yoke 114 to the left as viewed in FIG. 2. Yoke 112 has been moved upwardly out of its assembled position in FIG. 3 for ease of understanding, and therefore, actuator pin 178 is not shown in engagement with tangs 152 in the FIG. 3 view.

A plate 182 is rigidly secured intermediate bell cranks 162 to tubular member 154. Plate 182 includes a pair of ears 184 which engage inner tangs 150 of springs 146 and 148. The plate locates the tangs 150 relative to one another while the bell cranks 162 via the ears 170 on pawls 166 and their rigid interconnection through tubular member 154 locate the tangs 152 of springs 146 and 148 relative to one another. In this way the force transmitted by the springs 146 and 148 is equally applied to each of the pawls 166. Plate 182 projects upwardly (FIGS. 2 and 3) for engagement with actuator pin 178. In assembly, actuator pin 178 is nestled between plate 182 and tangs 150 whereby movement to the left in FIG. 2 will result in the exertion of force against tangs 150 and movement to the right will result in the exertion of force against plate 182.

Springs 146 and 148 are preloaded. When brake adjuster 28 is removed from the housing 52 the counterclockwise force exerted by tangs 150 on ears 184 is transmitted to tubular member 154 and balanced by the clockwise force exerted by tangs 152 on ears 170 transmitted to tubular member 154 via pawls 166, ears 164 and pivot pins 168 and bell cranks 162. In assembly, the force exerted by tangs 152 creates a moment around pivot pins 168 tending to force ends 172 of pawls 166 downwardly against ratchet wheels 78. As seen in FIG. 3 the pawls, in assembly, do not contact ears 164 of bell crank 162 when ends 172 contact ratchet wheels 78.

The brake actuator and brake adjuster operate as follows. Air motor 96 forces, via push rod 102, yoke 114, and body portion 118, tines 122 to the right, as viewed in FIG. 3, to move pins 134 outwardly from their rest position. Outward movement of pins 134 forces plungers 53 and 54 axially outward of passages 55 and 56 causing linings 20 of shoes 12 and 14 to engage the brake drum. For purposes of illustration, it will be assumed that in the described embodiment, one-half inch of yoke movement results in an average movement of thirty thousandths of an inch of linings 20 toward the brake drum. If the shoes are properly adjusted the linings will contact the brake drum after the thirty thousandths of an inch average movement.

During the one-half inch movement of tines 122, actuator pin 178 is forcing tangs 150 away from air motor 96 thereby moving pawls 166 to the right in FIG. 3 into engagement with the teeth of ratchet wheels 78 to the position illustrated in FIG. 2. Bell cranks 162 rotate with tubular member 154 about the elongated portions 158 of bolts 156 in ganged movement during movement of pawls 166. Further movement of yoke 114 causes further movement of tangs 150 by actuator pin 178 and force being transmitted to pawls 166 via springs 146 and 148.

In the absence of brake lining wear, contact will be made between linings 20 and the brake drum prior to the generation of enough movement in the respective pawls 166 to rotate ratchet wheels 78. As tines 122 move the linings of shoes 12 and 14 into engagement with the brake drum, tangs 150 will be moved forward generating greater energy in springs 146 and 148. The energy transmitting capacity of the springs however is insufficient to overcome the frictional torque necessary to rotate the respective ratchet wheels 78 within the ends of the respective plungers 53 and 54 due to the fact that the braking force exerted on the shoes is being transmitted axially through the plungers. Further movement of yoke 114 results in the winding of springs 146 and 148 and the generation of additional energy within the respective springs. It should be noted that tangs 150 can only be rotated to a position parallel to the longitudinal axis of guide rod 140. Thereafter further movement of yoke 114 will only result in actuator pin 178 sliding along tangs 150. When the plungers are locked up against extension by rotation of ratchet wheels 78, springs 146 and 148 act as "lost motion" mechanism absorbing excess adjustment energy.

The first one-half inch of yoke movement is used to take up the slack in the brake adjuster 28 which exists, for example, between pins 168 and pawls 166 and bell cranks 162, and between tubular member 154 and elongated portion 158 on bolts 156 and between the end of pawls 166 and the adjacent tooth on the respective ratchet wheel. Since the slack is needed in the given embodiment to prevent premature brake adjustment, the parts of the brake adjuster may be advantageously made without close tolerances. It should be appreciated that in the absence of enough slack, the actuator pin can be located in a manner to allow for some of the one-half inch of tine movement prior to the actuator pin contacting tangs 150. Thus, sufficient movement by pawls 166 to rotate ratchet wheels 78 does not occur until the shoes have been moved outwardly toward engagement with the brake drum an amount equivalent to the normal clearance, e.g., the previously referred to thirty thousandths of an inch, that is expected to exist between the shoes and the brake drum.

In the event that the distance between shoes 12 and 14 and the brake drum is greater than the amount of movement imparted to the shoes by the one-half inch movement of tines 122, as by wear of linings 20, the movement of pawls 166 is great enough to impart rotation to the ratchet wheels 78 relative to the ends of plungers 53 and 54. Such rotation will increase the distance between the first and second ends of each plunger during the actuation stroke to compensate for lining wear. The adjuster operates to take up a portion of the brake shoe lining wear that occurred on each previous brake application until the total brake shoe lining wear exceeds the predetermined amount, in which case, the pawls contact the following teeth on the respective ratchet wheels and take up the balance of the brake shoe lining wear that was not taken up during the previous adjustments. Further, as the ratchet wheels are rotating, the tines are continually moved outwardly causing increased axial movement of the plungers. It should be appreciated that due to the fact that bell cranks 162 are rigidly interconnected, pawls 166 rotate each ratchet wheet 78 an equal amount resulting in equal expansion of the respective plungers. If either shoe contacts the brake drum the respective plunger will become "locked up" thereby preventing further extension of that plunger as well as the other plunger as a result of ratchet wheel rotation and accordingly further movement of the pawls. It should be appreciated, however, that since corresponding parts of the adjustment mechanism, such as, the ratchet wheels, cannot be manufactured with identical tolerances that some flexibility in the pawls, tubular member and bell cranks is desirable to insure proper adjustment of the plungers. Such flexibility is desired to insure that each of the pawls will move to the next tooth at the same time and thereby adjust the length of each plunger simultaneously by a corresponding amount. In the absence of such desired flexibility it is possible to have one plunger adjusted an amount greater than the other plunger.

It is desirable to provide stops 186 (FIG. 2) on housing 52 within chamber 63 to contact the lower portion 188 of ends 172 of pawls 166. The stops prevent undue pawl movement which could result in ends 172 passing completely over the respective ratchet wheels and becoming jammed. The stops are located to allow the pawls to move a distance which would be equivalent to the distance needed to move a tooth on each ratchet wheel one and a fraction of a tooth length beyond its previous rest position.

The back of plate 182 is constructed to engage actuator pin 178 for easy manual adjustment of the shoes. For this purpose, the openings 162 are of hex head configuration and of a size to be properly engaged with a standard hex head wrench. To adjust the brake mechanism, one only need to remove a bolt 156, locate a hex head wrench in the respective opening 162 and turn the wrench. The rotation of the wrench will in turn cause actuator pin 178 to move via tubular member 154 and plate 182 causing the tines to displace plungers 53 and 54 and the movement of pawls 166. Since both the brake actuator and the brake adjuster are being manipulated according to their standard movement, the shoes can be properly adjusted by a number of clockwise and counterclockwise turns of the hex head wrench. After adjustment, the bolt 156 is returned to its threaded position in housing 52.

From the preceding it should be apparent that the adjustment of the shoes 12 and 14 is effected on the actuation stroke of the tines 122 as opposed to on the return stroke. Moreover, adjustment is effected only when there is abnormal clearance between both shoes and the brake drum. The present brake mechanism is thus not subject to making a premature adjustment of the shoes due to brake drum expansion and shoe distortion caused by high plunger forces.

An important feature of the operation of the brake mechanism is that the plungers 53 and 54 are moved an equal distance by the tines 122, regardless of the fact that one of the shoes is a leading shoe and the other is a trailing shoe. Anchor 64 serves to isolate the plunger forces from each other by absorbing the excess forces. Thus, regardless of the forces acting on the shoes, the tines operate to move each shoe through an equal distance. Similarly, the adjuster mechanism 28 simultaneously adjusts each plunger 53 and 54 in a manner to provide that the assemblies are of substantially equal length at all times and accordingly result in equal movement of the respective shoes 12 and 14.

After substantial wear of linings 20 the plungers 53 and 54 will be extended a substantial distance relative to their initial starting point. It is desirable after linings 20 have been worn to remove the shoes and the brake drum and replace the linings and if necessary grind the braking surface of the brake drum. This is often made difficult by the fact that due to substantial adjustment of the plungers and wear of the braking surfaces, the brake drum is not readily removable from the linings. In prior art arrangements removal of the drum often required disassembly of the respective brake adjuster and movements of the adjusters to a position in which the shoes are inwardly located relative to the brake drum. Disassembly of the brake adjuster is not required in the present invention due to the use of the trapezoidal plate 40. Removal of the fasteners 46 disconnects the plate 40 from the respective tab 48. The plate 40 is free to be removed from the brake assembly allowing the second ends 34 and 36 of the shoes 12 and 14 to be moved together a sufficient distance to allow for clearance between the shoes and the brake drum. The shoes may thereafter be removed from the first ends 57 and 58 of the respective plunger 53 and 54 by sliding the ends out of the respective slots. Either the plungers may be removed and readjusted and thereafter replaced or each first end 57, 58 may be rotated in a direction reverse to its adjusting direction while the ratchet wheels are held stationary to reset the plungers. A new set of shoes may be located in slots 59 and 60 and the plate 40 replaced. The brake adjuster may then be manually adjusted as previously described. Disassembly of the brake adjuster is therefore only required during maintenance of the brake adjuster and not brake shoe replacement.

The construction of the brake actuator and the brake adjuster allow for their location in chamber 63 which should be sealed from the surrounding environment. to this end seals, such as "O" rings 190, may be located in passages 55 and 56 contacting ends 57 and 58 or boot seals may be placed between plunger ends 58 and 59 and the housing. Gaskets of a known design may be interposed between air motor 96 and housing 92, housing 92 and housing 52, and housing 52 and plate 62. Seal 112 prevents the introduction of contaminants from air motor 96. Thus, brake adjuster 26 and brake actuator 28 are completely enclosed in their own dustproof environment. Chamber 63 may be packed with a substantial amount of grease to reduce wear of the components.

What is claimed is:

1. A braking mechanism for use with a brake assembly of the type including a pair of brake shoes each shoe having a first end opposite from one another, a brake drum, and means supporting the shoes for movement from an initial position, into contact with the drum for effecting braking of the drum; the brake mechanism comprising:
    actuator means including at least one tine adapted to be operatively engaged with the first end of each of the shoes for effecting a first movement of the shoes tending to effect contact with the drum; and
    adjuster means operative concurrently with the operation of the actuator means and engaged with the tine and the first end of each of the shoes for effecting a second, further movement of the shoes toward the drum after the actuator means have moved the shoes beyond a predetermined distance toward the drum.

2. A braking mechanism according to claim 1 further comprising:
    a housing adapted to be secured to the supporting means intermediate the first ends of the shoes and defining a chamber; and wherein the actuator means and the adjuster means are located within the chamber.

3. A braking mechanism according to claim 1 wherein the adjuster means comprises:
    a pair of plungers, each plunger being adapted to be located intermediate the first end of one of the shoes and the actuator means and including
        1. a nut-like member having a first end and a second end having a threaded portion and
        2. a screw-like member having a first end and a second end having a threaded portion in mating engagement with the threaded portion of the respective nut-like member; and
    means operative during movement of the shoes toward the drum to exert a rotational force on one of the members of each plunger tending to rotate the one member relative to the other member of the plunger to vary the distance between the first ends of the respective member to move the shoes further toward the drum.

4. A braking mechanism according to claim 3 wherein:
    the first end of one of the members of each plunger is adapted to be engaged with the first end of the respective shoe; and
    the first end of the other member of each plunger is operatively engaged with the actuator means.

5. A braking mechanism according to claim 4 wherein:
    the member of each plunger engaged with the actuator means is mounted for rotation about the axis of its threaded portion;
    the exerting means exerts the rotation force on the member of each plunger engaged with the actuator means; and
    the first end of the member of each plunger engaged with the shoe is adapted to be locked against rotational movement about the axis of its threaded portion with the first end of the respective shoe.

6. A braking mechanism according to claim 5 wherein:
    the member of each plunger engaged with the shoe is the nut-like member;
    the member of each plunger engaged with the actuator means is the screw-like member and includes a first element defining the threaded portion on its one end and a second element journaled at its one end on the other end of the first element and operatively engaged with the actuator means at its other end;
    a ratchet wheel is provided on each of the first elements; and
    the exerting means includes
    1. a pair of pawls each engaged with one of the ratchet wheels to rotate the respective ratchet wheel during movement of the pawl,
    2. a bell crank pivotally secured to each pawl,
    3. a member interconnecting the bell cranks for ganged movement,
    4. means mounting the member interconnecting the bell cranks relative to the actuator means for rotational movement, and
    5. means biasing each pawl into engagement with the respective ratchet wheel to rotate each ratchet wheel when the shoes have been moved toward the drums beyond a predetermined distance.

7. A braking mechanism according to claim 6 wherein:

the nut-like member and the elements of the screw-like member of each plunger are axially aligned;

the actuator means includes means to axially move the second element of each screw-like member from a first position to a second position; and the means biasing the pawls includes a pair of preloaded torsional springs adjacent one another, located between the bell cranks and encircling the member interconnecting the bell cranks, each spring includes a first tang on the end proximate the adjacent spring and a second tang on the end proximate a bell crank, the first tang of each spring is engaged with the means to move the second elements, and the second tang of each spring is engaged with a pawl to bias the pawl toward engagement with the respective ratchet wheel whereby the interconnection of the bell cranks and the pivotal connection of the pawls to the bell cranks results in ganged movement of the pawls.

8. A braking mechanism for use with a brake assembly of the type including a brake drum and a pair of brake shoes, the braking mechanism comprising:

means for supporting the shoes for movement from an initial position into contact with the drum;

a pair of adjusters each having a first member engaged with one end of the shoes, a second member, and a third member intermediate the first and second members and having a threaded portion in threaded engagement with one of the first and second members and another portion journaled with the other member to vary the distance between the first and second members in response to rotation of the third member, the first member, second member and third member of each adjuster being axially aligned;

means mounting each adjuster for axial movement of the first, second and third members as a unit;

actuator means engaged with the second members of the adjusters for axially displacing each adjuster from an initial position to a position in which the respective shoe contacts the drum; and means operative concurrently with the actuator means to rotate the third members and increase the axial distance between the first and second members of the adjusters during movement of the shoes toward the drums when the actuator means have moved the shoes beyond a predetermined distance toward the drum.

9. A braking mechanism according to claim 8 wherein:

a ratchet wheel is provided on the third member of each adjuster; and the means to rotate includes 1. a pair of torsional springs each having a tang projecting away from each end thereof, one of the tangs of each spring being engaged with the actuator means and movable thereby, and 2. a pawl engaged with the ratchet wheel of each adjuster and the other tang of each of the springs whereby the movement of the one tang transmits a force via the springs and the other tangs to the pawls to force the pawls in a direction to rotate the ratchet wheels.

10. A braking mechanism according to claim 9 wherein:

the first member of each adjuster includes an end portion having a slot; and the first end of each shoe includes a portion in sliding engagement within the slot of the respective first member.

11. A braking mechanism according to claim 8 wherein:

the means mounting each adjuster is a housing defining a chamber communicating with a pair of angularly disposed passages;

one of the adjusters is located in each of the passages; and the actuator means and the means to rotate are located within the chamber.

12. A braking mechanism according to claim 11 wherein:

the first member of each adjuster includes an end portion having a slot;

each shoe includes an end in sliding engagement with the slot of the respective first member; and the second member of each adjuster is locked against rotational movement about its axis in the respective passage.

13. A brake adjuster for use with a brake assembly of the type having a brake drum, a pair of brake shoes for effecting braking of the drum, each shoe having a first end opposite from one another, a bracket supporting the shoes for movement from an initial position into contact with the drum, and a movable member interposed between the first ends of the shoes to effect movement of the shoes an equal amount toward the drum upon movement of the member; the brake adjuster comprising:

a pair of plungers of variable overall length between a first end and a second end, each plunger having the first end adapted to be engaged with the movable member and the second end adapted to be engaged with the first end of one of the shoes; and means acting concurrently with movement of the movable member for increasing the overall length of each plunger during movement of the shoes toward the drums after the movable member has moved the shoes beyond a predetermined distance toward the drum.

14. A brake adjuster according to claim 13 wherein the increasing means comprises:

signal means operative to generate a signal which is proportional in magnitude to the amount of movement of the shoes from the initial position toward the drum; and means operative in response to the signal to generate a force proportional in magnitude to the magnitude of the signal to increase the overall length of the plungers.

15. A brake adjuster according to claim 14 wherein: each plunger includes 1. a first element having a threaded portion and the first plunger end, and 2. a second element having a threaded portion in threaded engagement with the threaded portion of the first element and the second plunger end;

a ratchet wheel is secured to one of the elements of each plunger;

means are provided for preventing rotation of the other element of each plunger about an axis intersecting the ends of each plunger;

the signal means includes a pair of cylindrical torsional coil springs having a tang located at opposite ends thereof, one of the tangs of each spring being adapted to be engaged with the movable member to transmit a force to the other tang in proportion to the amount of movement of the member;

the force generating means includes
1. a pair of pawls operatively engaged at one end with the other tang of each spring and at the other end with one of the ratchet wheels, and
2. a pair of bell cranks interconnected for ganged movement and each pivotally connected to one of the pawls at the end engaged with the tang; and means are provided for connecting the bell cranks for pivoting movement relative to the drum.

16. A brake adjuster according to claim 13 further comprising:
a housing adapted to be rigidly secured relative to the drum and defining a chamber including a pair of angularly disposed passages, the chamber being adapted to house the movable member; and wherein
one of the plungers is in sliding engagement with each of the passages; and
the means to increase the overall length of each plunger are located within the chamber and operatively engaged with each of the plungers.

17. A braking mechanism for use with a brake assembly of the type having a brake drum, a pair of brake shoes for effecting braking of the brake drum and a bracket supporting the shoe for movement from an initial position into contact with the brake drum, the brake mechanism comprising:
a pair of plungers of variable overall length between a first and a second end, one of the ends of each plunger being engaged with one end of each shoe;
actuator means operatively engaged with the other end of each plunger to effect a first movement of each plunger lengthwise; and
means acting concurrently with the actuator means for varying the overall length of each plunger to effect a second movement of the shoes toward the drum during movement of the shoes toward the drum by the actuator means after the actuator means has moved the shoes beyond a predetermined distance toward the drums.

18. A braking mechanism according to claim 17 further comprising:
a housing defining a chamber, and wherein
the actuator means, the varying means, and the other end of each plunger are located in the chamber.

19. A braking mechanism according to claim 7 further comprising:
a plate located between the springs and secured to the member interconnecting the bell cranks; and
means on the plate for moving the means to axially move the second elements in response to rotation of the member interconnecting the bell cranks thereby providing for manual adjustment of the braking mechanism upon rotation of the member interconnecting the bell cranks.

20. A braking mechanism according to claim 9 wherein:
a pair of bell cranks are provided;
a member interconnects the bell cranks for ganged movement;
each pawl is pivotally connected at one end to a bell crank between the member interconnecting the bell cranks and the engagement of the other tang; and
means are provided for mounting the member interconnecting the bell cranks for rotational movement.

21. A brake adjuster according to claim 13 wherein:
the means includes a support member mounted for rotational movement, the support member being rotated during the varying of the overall length of each plunger; and
means are provided to move the movable member interposed between the first ends of the shoes to effect movement of the shoes toward the drum in response to rotational movement of the support member whereby the support member may be rotated to manually adjust the shoes relative to the drum.

22. A braking mechanism according to claim 7 further comprising:
a plate rigidly secured to the member interconnecting the bell cranks and located intermediate the bell cranks; and wherein
the first tang of each spring is engaged with the plate.

* * * * *

UNITED STATES PATENT OFFICE
CERTIFICATE OF CORRECTION

PATENT NO. : 3,869,025
DATED : 03/04/75
INVENTOR(S) : James L. Oliver

It is certified that error appears in the above-identified patent and that said Letters Patent are hereby corrected as shown below:

| | |
|---|---|
| ol. 4, line 13: | "62" should read ---64---. |
| ol. 6, line 4: | "112" should read ---114---. |
| ol. 7, line 60: | "wheet" should read ---wheel---. |

Signed and sealed this 29th day of April 1975.

(SEAL)
Attest:

RUTH C. MASON
Attesting Officer

C. MARSHALL DANN
Commissioner of Patents
and Trademarks